United States Patent
O'Reilly et al.

(10) Patent No.: US 9,178,947 B2
(45) Date of Patent: Nov. 3, 2015

(54) METHOD, SYSTEM AND APPARATUS FOR CONFIGURING A DEVICE FOR INTERACTION WITH A SERVER

(75) Inventors: Jacob Samuel O'Reilly, Fredericton (CA); Ryan Brock Proudfoot, Fredericton, CA (US)

(73) Assignee: BLACKBERRY LIMITED, Waterloo (CA)

( * ) Notice: Subject to any disclaimer, the term of this patent is extended or adjusted under 35 U.S.C. 154(b) by 285 days.

(21) Appl. No.: 12/813,261

(22) Filed: Jun. 10, 2010

(65) Prior Publication Data

US 2011/0219132 A1 Sep. 8, 2011

Related U.S. Application Data

(60) Provisional application No. 61/309,984, filed on Mar. 3, 2010.

(51) Int. Cl.
*G06F 15/16* (2006.01)
*H04L 29/08* (2006.01)

(52) U.S. Cl.
CPC ............ *H04L 67/16* (2013.01); *H04L 67/2814* (2013.01); *H04L 67/1002* (2013.01)

(58) Field of Classification Search
None
See application file for complete search history.

(56) References Cited

U.S. PATENT DOCUMENTS

| | | | |
|---|---|---|---|
| 7,353,295 | B1 | 4/2008 | Crow et al. |
| 2002/0029273 | A1 | 3/2002 | Haroldson et al. |
| 2002/0143964 | A1 | 10/2002 | Guo et al. |
| 2002/0194325 | A1 | 12/2002 | Chmayteli et al. |
| 2002/0197991 | A1 | 12/2002 | Anvekar et al. |
| 2003/0045273 | A1 | 3/2003 | Pyhalammi et al. |
| 2003/0066065 | A1 | 4/2003 | Larkin |
| 2004/0045000 | A1 | 3/2004 | Hara |
| 2004/0083317 | A1 | 4/2004 | Dickson et al. |
| 2004/0122907 | A1 | 6/2004 | Chou et al. |
| 2005/0027846 | A1 | 2/2005 | Wolfe et al. |
| 2005/0132083 | A1 | 6/2005 | Raciborski et al. |

(Continued)

FOREIGN PATENT DOCUMENTS

| | | |
|---|---|---|
| EP | 1098489 A2 | 5/2001 |
| EP | 1865744 A1 | 12/2007 |

(Continued)

OTHER PUBLICATIONS

European Patent Application No. 10154679.4 Search Report mailed Oct. 21, 2010.

(Continued)

*Primary Examiner* — Abdullahi E Salad
(74) *Attorney, Agent, or Firm* — Perry + Currier Inc.

(57) ABSTRACT

A method to a method, system and apparatus for configuring a device for interaction with a server is provided. An intermediation infrastructure mediates registration traffic between any of a plurality of application servers hosting a server-side application and any of a plurality of computing devices executing a client-side application that corresponds to the server-side application. The intermediation infrastructure receives account registration information, including an account identifier and a server identifier, from an application server that is hosting an account. Any one of the computing devices can access the intermediation infrastructure using the account identifier and thereby determine the server identifier and thereafter direct communications with the application server can be effected.

19 Claims, 9 Drawing Sheets

(56) References Cited

U.S. PATENT DOCUMENTS

| | | | |
|---|---|---|---|
| 2005/0163072 A1 | | 7/2005 | Park et al. |
| 2005/0201320 A1 | | 9/2005 | Kiss et al. |
| 2006/0129638 A1 | | 6/2006 | Deakin |
| 2007/0268515 A1 | * | 11/2007 | Freund et al. ............... 358/1.15 |
| 2007/0268516 A1 | | 11/2007 | Bugwadia et al. |
| 2008/0066190 A1 | * | 3/2008 | Shu et al. ..................... 726/28 |
| 2008/0091835 A1 | | 4/2008 | Yuan |
| 2008/0140650 A1 | * | 6/2008 | Stackpole ........................ 707/5 |
| 2008/0256607 A1 | | 10/2008 | Janedittakarn et al. |
| 2009/0069001 A1 | | 3/2009 | Cardina et al. |
| 2009/0112981 A1 | * | 4/2009 | Markovich ................... 709/203 |
| 2009/0252325 A1 | | 10/2009 | Reus et al. |
| 2010/0010899 A1 | | 1/2010 | Lambert et al. |
| 2010/0180016 A1 | * | 7/2010 | Bugwadia et al. ........... 709/220 |
| 2010/0317320 A1 | | 12/2010 | Sakargayan |
| 2011/0035589 A1 | | 2/2011 | Butcher et al. |

FOREIGN PATENT DOCUMENTS

| | | |
|---|---|---|
| WO | 01/95587 A2 | 12/2001 |
| WO | 2005/015935 A1 | 2/2005 |
| WO | 2007/111598 A1 | 10/2007 |

OTHER PUBLICATIONS

Canadian Patent Application No. 2682833 Office Action dated Jan. 23, 2012.

BitTorrent, downloaded from http://www.cs.chalmers.se/~tsigas/Courses/DCDSeminar/Files/BitTorrent.pdf.

How Instant Messaging Works, downloaded from http://communication.howstuffworks.com/instant-messaging2.htm.

Corresponding European Patent Application No. 10165549.6 Search Report dated Jun. 8, 2011.

Non-hacked iPhones not recognizing SIM cards after 1.1.1. update, downloaded from http://reviews.cnet.com/8301-19512_7-10115181-233.html.

http://forums.appleinsider.com/archive/index.php/t-76110.html.

Jajah, Mobile Plugin, downloaded from http://www.jajah.com/support/faq/plugin/.

Emt-POstimees News, downloaded from http:/www.emt.ee/wwwmain?screenId=content.private&componentId=MenuComponent&actionid=menuSelect&actionPharm=1161&language=ENG.

White Paper, K800, Published by Sony Ericsson Mobile Communications AB, Feb. 2006.

European Patent Application No. EP 10 16 6650 Search Report mailed Nov. 22, 2010.

Pdf document: Mobile Java Push; Mar. 2009 downloaded from http://web.archive.org/web/20090511131417/http://labs.ericsson.com/apis/mobile-java-push/.

YouTube video—Mobile Java Push—Quick Start; Uploaded by MobileJavaPush on Mar. 31, 2009.

Examination Report dated Oct. 30, 2014, issued to Corresponding Canadian Patent Application No. 2733132.

* cited by examiner

METHOD, SYSTEM AND APPARATUS FOR CONFIGURING A DEVICE FOR INTERACTION WITH A SERVER

PRIORITY CLAIM

The present specification claims priority from U.S. Provisional Patent Application 61/309,984 filed Mar. 3, 2010, the contents of which are incorporated herein by reference.

FIELD

The present specification relates generally to telecommunications and more particularly relates to a method, system and apparatus for configuring a device for interaction with a server.

BACKGROUND

Computing devices that connect to servers frequently connect to those servers via one or more network intermediaries, such as a mobile telecommunication carrier, an enterprise, or a manufacturer of the computing device.

DETAILED DESCRIPTION OF THE EMBODIMENTS

An aspect of this specification provides a method for configuring a computing device for interaction with a server comprising: receiving an account identifier at the computing device, the account identifier associated with an account on an application server; sending the account identifier to a registration server, the registration server configured to determine an application server identifier associated with the account identifier, the application server identifier associated with the application server; receiving the application server identifier, at the computing device, from the registration server; establishing communication between the computing device and the application server using the application server identifier at the computing device to locate the application server; and accessing the account from the computing device using the account identifier.

The account identifier can be associated with a client-side application executable on the computing device, the client-side application can correspond to a server-side application executable on the server, the account can be associated with the server-side application. The sending the account identifier to a registration server can include sending the account identifier to a registration server via a mediation server and a gateway. The establishing communication can include establishing communication between the client-side application and the server-side application. The account identifier can correspond with credentials of the account. The application server identifier can correspond with a network address of the application server.

The method can further comprise prior to the receiving the account identifier, creating the account, at the application server; loading the credentials of the account at the application server; sending the application server identifier and the account identifier from the application server to the registration server; receiving the application server identifier and the account identifier at the registration server, from the application server; and storing the application server identifier and the account identifier at the registration server.

The client-side application can include a social networking client application and the server-side application includes a social networking server application. The client-side application can include an email client application and the server-side application includes an email server application.

Another aspect of this specification comprises a computing device comprising: a processor configured to receive an account identifier, the account identifier can be associated with an account on an application server; the processor further configured to send the account identifier to a registration server, the registration server configured to determine an application server identifier associated with the account identifier, the application server identifier associated with the application server; the processor further configured to receive the application server identifier from the registration server; the processor further configured to establish communication between the computing device and the application server using the application server identifier at the computing device to locate the application server; and the processor further configured to access the account from computing device using the account identifier.

The account identifier can be associated with a client-side application executable on the computing device, the client-side application can correspond to a server-side application executable on the server, the account can be associated with the server-side application. The send the account identifier to a registration server can include send the account identifier to a registration server via a mediation server and a gateway. The establish communication can include establish communication between the client-side application and the server-side application. The account identifier can correspond with credentials of the account. The application server identifier can correspond with a network address of the application server. The client-side application can include an email client application and the server-side application includes an email server application.

Another aspect of this specification comprises a registration server configured to: receive an account identifier from a computing device, the account identifier associated with a client-side application executable on the computing device, the client-side application corresponding to a server-side application executable on a server, the account identifier associated with an account on the server-side application; determine an application server identifier associated with the account identifier, the application server identifier associated with an application server; and send the application server identifier to the computing device.

The registration server further configured to: receive, from the application server, the application server identifier and the account identifier; and store the application server identifier and the account identifier.

Another aspect of this specification comprises a computer program product, for a' computing device, comprising a computer readable storage medium having a computer-readable program code adapted to be executable on the computing device to implement a method to configure the computing device for interaction with a server, the method comprising: receiving an account identifier at the computing device, the account identifier associated with an account on an application server; sending the account identifier to a registration server, the registration server configured to determine an application server identifier associated with the account identifier, the application server identifier associated with the application server; receiving the application server identifier, at the computing device, from the registration server; establishing communication between the computing device and the application server using the application server identifier at the computing device to locate the application server; and accessing the account from the computing device using the account identifier.

A method, system and apparatus for configuring a device for interaction with a server is provided. An intermediation infrastructure mediates registration traffic between any of a plurality of application servers hosting a server-side application and any of a plurality of computing devices executing a client-side application that corresponds to the server-side application. The intermediation infrastructure receives account registration information, including an account identifier and a server identifier, from an application server that is hosting an account. Any one of the computing devices can access the intermediation infrastructure using the account identifier and thereby determine the server identifier and thereafter direct communications with the application server can be effected.

Figure 1:
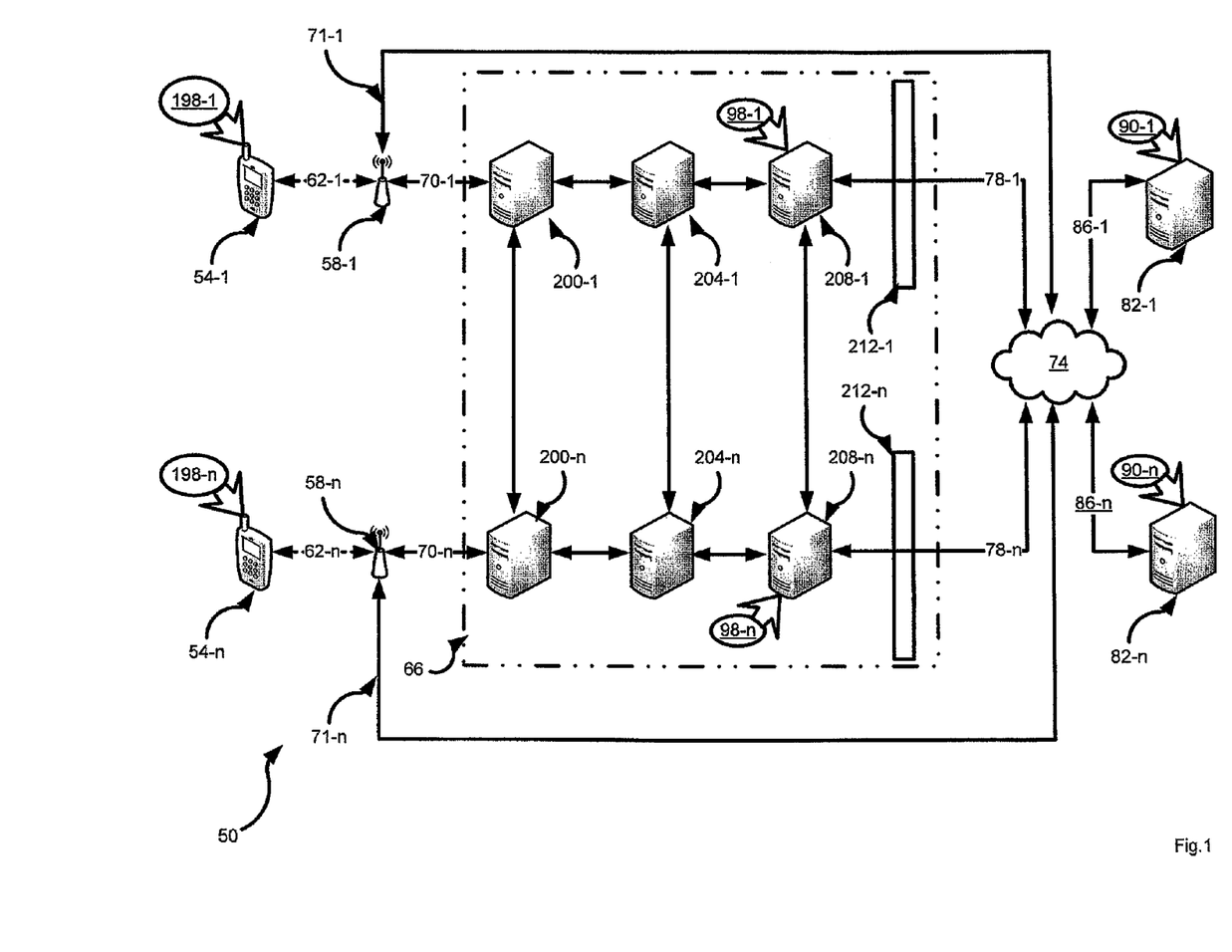
FIG. 1 is a schematic representation of a system for configuring a device for interaction with a server.

Referring now to FIG. 1, a system for configuring a device for interaction with a server is indicated generally at 50. System 50 comprises a plurality of computing devices 54-1 ... 54-n. (Hereafter, generically these are referred to as computing device 54, and collectively, computing devices 54. This nomenclature is used elsewhere herein.) Each computing device 54 is configured to connect to one or more wireless access points 58 (shown as access points 58-1 and 58-n, collectively access points 58) via a wireless link 62 (shown as links 62-1 and 62-n, collectively links 62).

Figure 2:
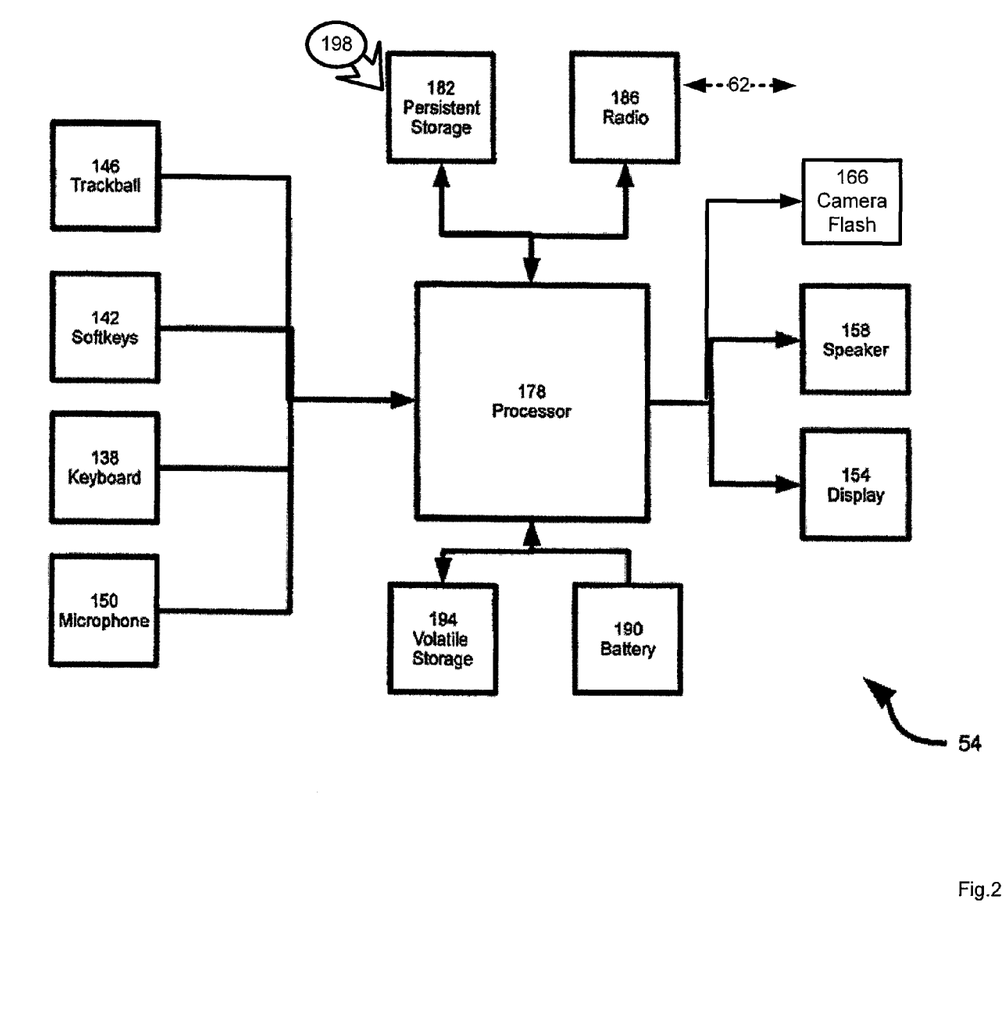
FIG. 2 is a schematic representation of a computing device of FIG. 1.

The structure and features of each client device 54 can vary. However, to provide a non-limiting example, FIG. 2 shows a block diagram representing exemplary components of client device 54. Client device 54 thus includes a processor 178 which interconnects input devices of client device 54 (e.g. a trackball 146, soft keys 142, keyboard 138, and a microphone 150) and output devices of client device 54 (e.g. a speaker 158, a display 154 and a camera flash 166). Other types of input devices and output devices are contemplated. Non-limiting examples of input devices include a touch screen, a trackwheel, a joy stick, and a touch screen. Non-limiting examples of output devices include haptic output devices, led indicators, and screen lighting. Processor 178 is also connected to a persistent storage device 182. As discussed earlier, persistent storage device 182 can be implemented using flash memory or the like, or can include other programmable read only memory ("PROM") technology or can include read only memory ("ROM") technology or can include a removable "smart card" or can comprise combinations of the foregoing. Those skilled in the art will now recognize that persistent storage device 182 and volatile storage 194 are each non-limiting examples of computer readable media capable of storing programming instructions that are executable on processor 178.

Device 54 also includes a wireless radio 186 that connects wirelessly to access point 58 to provide wireless email, telephony and web-browsing functionality. Client device 54 also includes a battery 190 which is typically rechargeable and provides power to the components of client device 54. In FIG. 2, for simplicity battery 190 is only shown connected to processor 178, but it will be understood that battery 190 is connected to any component (e.g. radio 186 and display 154) within client device 54 that consumes power to operate. Client device 54 also includes volatile storage 194, which can be implemented as random access memory ("RAM"), which can be used to temporarily store applications and data as they are being used by processor 178. Collectively, one can view processor 178, volatile storage 194 and persistent storage device 182 and as a microcomputer. It is now apparent that device 54 can be based on the structure and functionality of a portable wireless device such as a BlackBerry™ device from Research in Motion Inc., of Waterloo Canada, but it is to be stressed that this is a purely exemplary client device, as client device 54 could also be based on any type of client computing device including portable wireless devices from other manufacturers, desktop computers, laptop computers, cellular telephones and the like.

The microcomputer implemented on client 54 is thus configured to store and execute the requisite BIOS, operating system and applications to provide the desired functionality of client 54. In a present embodiment, each client 54 maintains at least client-side application 198 (shown as client-side applications 198-1 and 198-n in FIG. 1, collectively client-side applications 198), the details of which will be discussed further below, although each client 54 may also maintain a plurality of other applications as well.

Referring again to FIG. 1, computing device 54-1 is shown connected to access point 58-1, while computing device 54-n is shown connected to access point 58-n, but it is to be understood that either computing device 54 can connect to either access point 58. Furthermore it is to be understood that various configurations are contemplated as to how the infrastructure of each access point 58 is implemented. As a non-limiting example, it is contemplated that where a carrier operates access point 58-1, then that carrier may also issue the carrier-subscription to computing device 54-1 that permits computing device 54-1 to connect to access point 58-1. Likewise, it is also contemplated that a carrier that operates an access point 58-2 (not shown) may also issue the carrier-subscription to computing device 54-n that permits a computing device 54-2 (not shown) to connect to access point 58-n. The carrier that operates access point 58-1 may be the same or different from the carrier that operates access point 58-n. Where different carriers are involved, it will be understood that system 50 contemplates roaming configurations whereby a particular computing device 54 is considered to be roaming if it connects to an access point 58 that is operated by a different carrier. It will also now be understood that more than two computing devices 54, access points 58, and carriers are contemplated in various implementations.

Each link 62 can be based on any wireless protocol, including but not limited to Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11, Bluetooth™ or any of their variants or successors. It is also contemplated each computing device 54 can include multiple radios 186 to accommodate the different protocols that may be used to implement each link 62. It is also contemplated that in other embodiments, one or both access points 58 can be wired access points so that link(s) 62 are also wired. It will now be understood that each access point 58 is configured to communicate with device 54 according to the type of respective link 62, and that in some variations one or both links 62 can be wired.

Each access point 58, in turn is connected to an intermediary infrastructure 66 via links 70 (shown as links 70-1 and 70-n in FIG. 1, collectively links 70). Furthermore, each access point 58 is connected directly to Internet 74 (or other type of wide area network) via links 71 (shown as links 71-1 and 71-n in FIG. 1, collectively links 71), and thus communications can be effected with Internet 74 directly via links 71 or through intermediation infrastructure 66. Again, the nature of each link 70, 71 is not particularly limited, and typically corresponds to its type of access point 58. Each link 70, 71 can, for example, be wired as backhaul via a T-carrier link (e.g. T1, T3) or E-carrier link or the like. Intermediary infrastructure 66 in turn is connected to the Internet 74 via links 78 (shown as links 78-1 and 78-n in FIG. 1, collectively links 78). Links 78 can also be backhaul like links 70. In other configurations, links 70 can be implemented via Internet 74 and thereby obviate the need for a direct connection through link 70 to intermediary infrastructure 66 from access points 58.

A plurality of application servers 82 (shown as application servers 82-1 and 82-n in FIG. 1, collectively application servers 82), in turn, connect to Internet 74 via links 86 (shown as links 86-1 and 86-n in FIG. 1, collectively links 86). Each application server 82 is different from the other, and thus each application server 82 is configured to host at least one server-side application 90 (shown as server-side applications 90-1 and 90-n in FIG. 1, collectively server-side applications 90). In system 50, server-side application 90 from a given application server 82 can be accessed by one or more computing devices 54 using a corresponding client-side application 198 via intermediary infrastructure 66, provided that particular device 54 has a subscription to access that server-side application 90. The type and nature of server-side application 90 is not particularly limited, but an email server application is an illustrative, but non-limiting example of a server-side application 90, while an email client application is an illustrative, non-limiting example of a corresponding client-side application 198. Another non-limiting example of a server-side application 90 is a social networking server application and the corresponding client-side application is a social networking client application. Yet another non-limiting example of a server-side application 90 is a weather server application and the corresponding client-side application is a weather client application. Yet another non-limiting example of a server-side application 90 is a stock quote server application and the corresponding client-side application is a stock quote client application. Yet another non-limiting example of a server-side application 90 is a sports score server application and the corresponding client-side application is a sports score client application. As will be explained further below, system 50 is configured such that each client 54 can readily locate a corresponding application server 82 for a given client-side application 198 having a complementary server-side application 90.

To provide a specific example that continues within the context of email, assume that server 82-1 is operated by a first enterprise, and that server-side application 90-1 is an email server application that hosts email accounts for that first enterprise. By the same token, assume that server 82-n is operated by a second enterprise, and that server-side application 90-n is an email server application that hosts email accounts for that second enterprise.

Furthermore, assume that device 54-1 is associated with the first enterprise, and that client-side application 198-1 is an email client application for which an email account has been created on server 82-1 using server-side application 90-1. By the same token, assume that device 54-n is associated with the second enterprise, and that client-side application 198-n is an email client application for which an email account has been created on server 82-n using server-side application 90-1. Note that in one aspect of this specification, in terms of software coding, applications 198 may all be identical. At the same time, applications 90 may also be identical. However, as indicated above, each instance of an application 198 may be uniquely associated with at least one of an application 90.

Devices 54, applications 198, servers 82, and applications 90 will be discussed further below, but before discussing further, intermediary infrastructure 66 will be discussed. There are a number of ways to implement intermediary infrastructure 66, however a specific intermediary infrastructure 66 is presently contemplated, whereby intermediary infrastructure 66 includes at least one gateway 200 (shown as gateways 200-1 and 200-n in FIG. 1, collectively gateways 200), at least one mediation server 204 (shown as mediation servers 204-1 and 204-n in FIG. 1, collectively mediation servers 204), at least one registration server 208 (shown as registration servers 208-1 and 208-n in FIG. 1, collectively registration servers 208), and at least one Internet firewall 212 (shown as firewalls 212-1 and 212-n in FIG. 1, collectively firewalls 212). In FIG. 1, a plurality of gateways 200 are employed, whereby one gateway 200 connects to a corresponding access point 58 via a corresponding link 70. Likewise, as shown in FIG. 1, a plurality of mediation servers 204 and a plurality of registration servers 208 are also employed.

Mediation servers 204 are configured to connect device 54 to a range of applications or services (not shown herein but which can include, by way of non-limiting example, web-browsing for devices 54, mapping applications for devices 54, or location based services for devices 54) including the push data service available from application servers 82 that are contemplated herein. Where such other applications or services are not provided, then mediation server 204 can be omitted altogether. Registration servers 208 implement registers 98 (shown as registers 98-1 and 98-n in FIG. 1, collectively registers 98), as discussed generally above and in more detail below.

In the presently contemplated configuration, gateway 200-1, mediation server 204-1, registration server 208-1 and firewall 212-1 are substantially dedicated to traffic associated with access point 58-1, while gateway 200-n, mediation server 204-n, registration server 208-n and firewall 212-n are substantially dedicated to traffic associated with access point 58-n. This presently contemplated configuration is believed to assist with load balancing. Cross connections (which can be implemented via Internet 74) between each gateway 200, mediation server 204, and registration server 208 permit traffic to be carried by either set in the event of failure of one set. Accordingly, gateway 200-1, mediation server 204-1, registration server 208-1 and firewall 212-1 can be configured to expect to manage traffic associated with computing device 54-1 (rather than computing device 54-*n*), so that, for example, register 98-1 contains registration information that is particularly relevant to computing device 54-1 and is primarily active in registration server 208-1, while register 98-*n* contains registration information that is particularly relevant to computing device 54-*n* and is primarily active in registration server 208-*n*. However, in the event that a computing device 54 were to roam so as to connect to another access point 58, the registration (and other functions) of intermediation infrastructure 66 can continue. For example, if computing device 54-1 were to connect to access point 58-*n*, then registration server 208-*n* can access registration server 208-1 in order to obtain register 98-1, and if computing device 54-*n* were to connect to access point 58-1, then registration server 208-1 can access registration server 208-*n* in order to obtain register 98-*n*. It will now be understood that this configuration can be scaled to thousands or millions of computing devices 54 and hundreds or thousands of access points 58. By the same token it will now be understood that this configuration can be particularly useful when access points 58 are located far from each other, such as in different cities, countries or continents.

Intermediation infrastructure 66 can also be configured to carry encrypted communications between computing devices 54 and servers 82, while otherwise still fulfilling registration and other intermediation functions. For example, registration servers 208 can be configured such that all communications over Internet 74 between registration servers 208 and servers 82 are encrypted, and that communications between registration servers 208 and computing devices 54 are also encrypted. Various sets of unique public and private key pairs can be deployed to effect such encryption. Likewise, gateways 200 and devices 54 can be configured such that all communications therebetween via access point 58 are encrypted. Unique public and private key pairs between each computing device 54 and each gateway 200 can be used to effect such encryption. Furthermore, encryption can be included between subscribing computing devices 54 and application servers 82 so that the ultimate payload between a computing device 54 and server 82 is encrypted along the entire pathway between application servers 82 and computing devices 54.

In one non-limiting specific example, according to the BlackBerry™ infrastructure from Research in Motion Ltd. of Waterloo, Ontario, Canada, computing devices 54 can be implemented as BlackBerry™ devices; gateways 200 can be implemented as a suitable variation of the Relay component of the BlackBerry™ infrastructure; and mediation servers 204 can be implemented as a suitable variation of the Mobile Data Services (MDS) servers of the BlackBerry™ infrastructure. Consistent with this non-limiting example, servers 82 executing server-side email applications 90 can be based on BlackBerry™ Enterprise Server or BlackBerry™ Internet Server environments. It is to be understood, however, that all or part of infrastructure 66, as described, including its various gateways 200, mediation servers 204, and registration servers 208 can be collapsed into a single server computing device, or otherwise implemented using other hardware structures.

Figure 3:
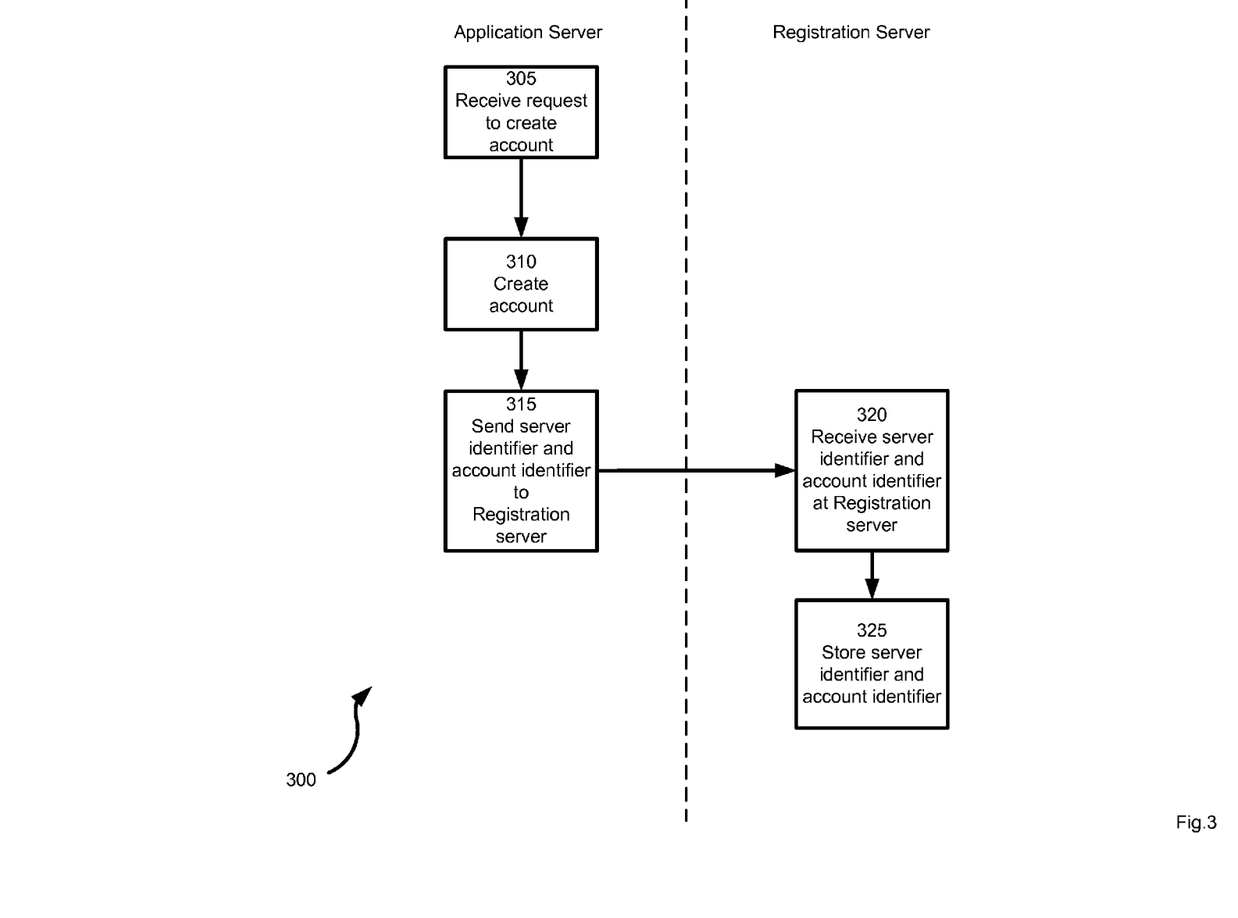
FIG. 3 shows a flowchart depicting a method for configuring a server for interaction with a device.

Referring now to FIG. 3, a method for configuring a server for interaction with a device is represented in the form of a flowchart and indicated generally at 300. Method 300 can be implemented using system 50 or variations thereof. Method 300 can also be implemented by application server 82.

Block 305 comprises receiving a request to create an account. The term "create an account" is not to be construed in a limiting sense, and generally comprises any activity where a given server-side application is configured to interact with a corresponding client-side application. For example, in the specific example being discussed above, where server-side application 90 is an email server application, then a creation of an account represents the establishment of a particular email account that is capable of sending and receiving email messages in conjunction with client-side application 198. Such a request typically originates via an administrative function available from server 82. The request can indicate multi-factor credentials for the account, such as a user name and password. While less secure, such credentials can be single factor (e.g. a single unique character string) in order to uniquely identify the account being created.

Figure 4:
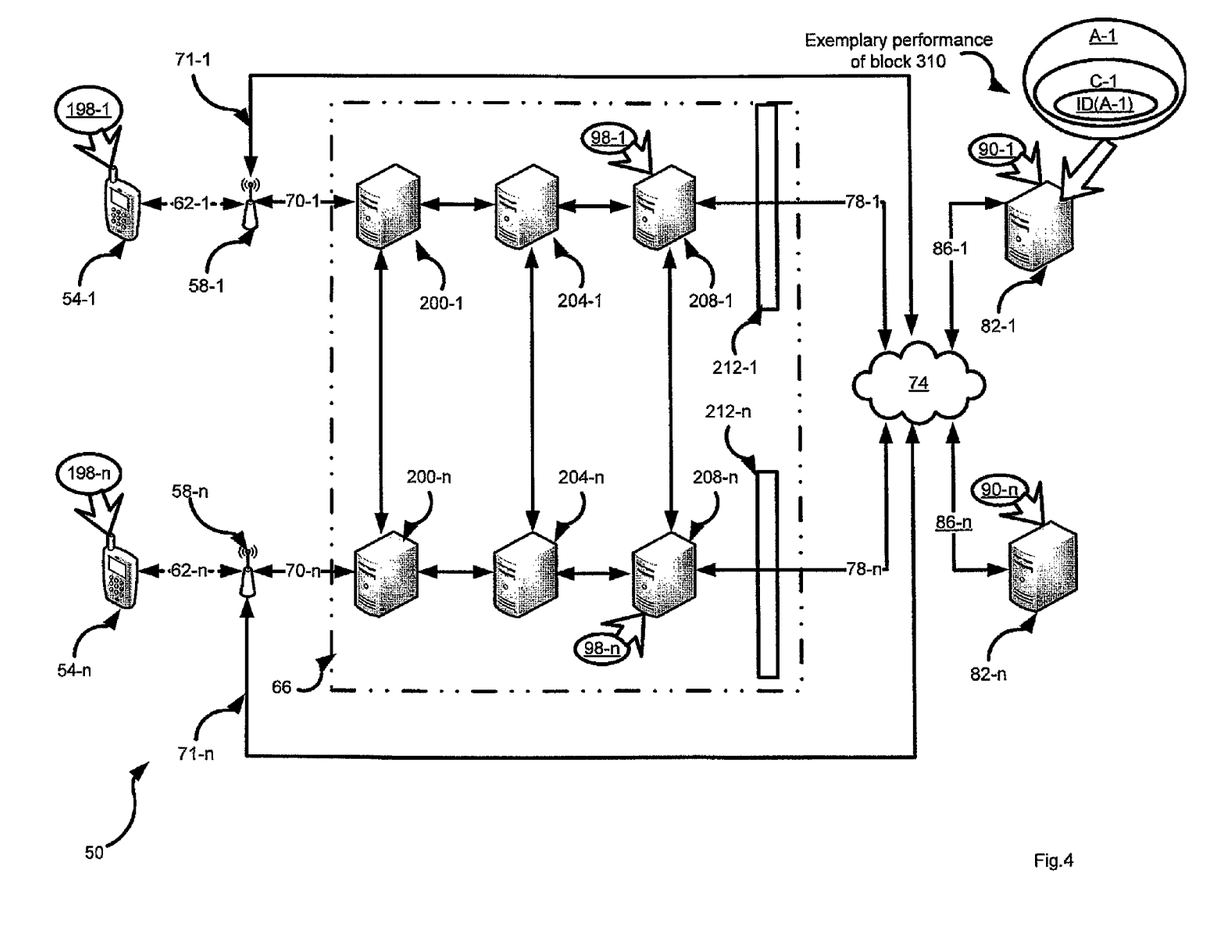
FIG. 4 shows the system of FIG. 1 during an illustrative example of performance of certain blocks of the method of FIG. 3.

Block 310 comprises creating the account per the request as contemplated at block 305. Performance of block 310 is represented in FIG. 4 as account A-1 with credentials C-1 is shown as now loaded on server 82-1. Of note is that such account creation is done on server 82 without any information as to which device 54 will access account A-1.

Figure 5:
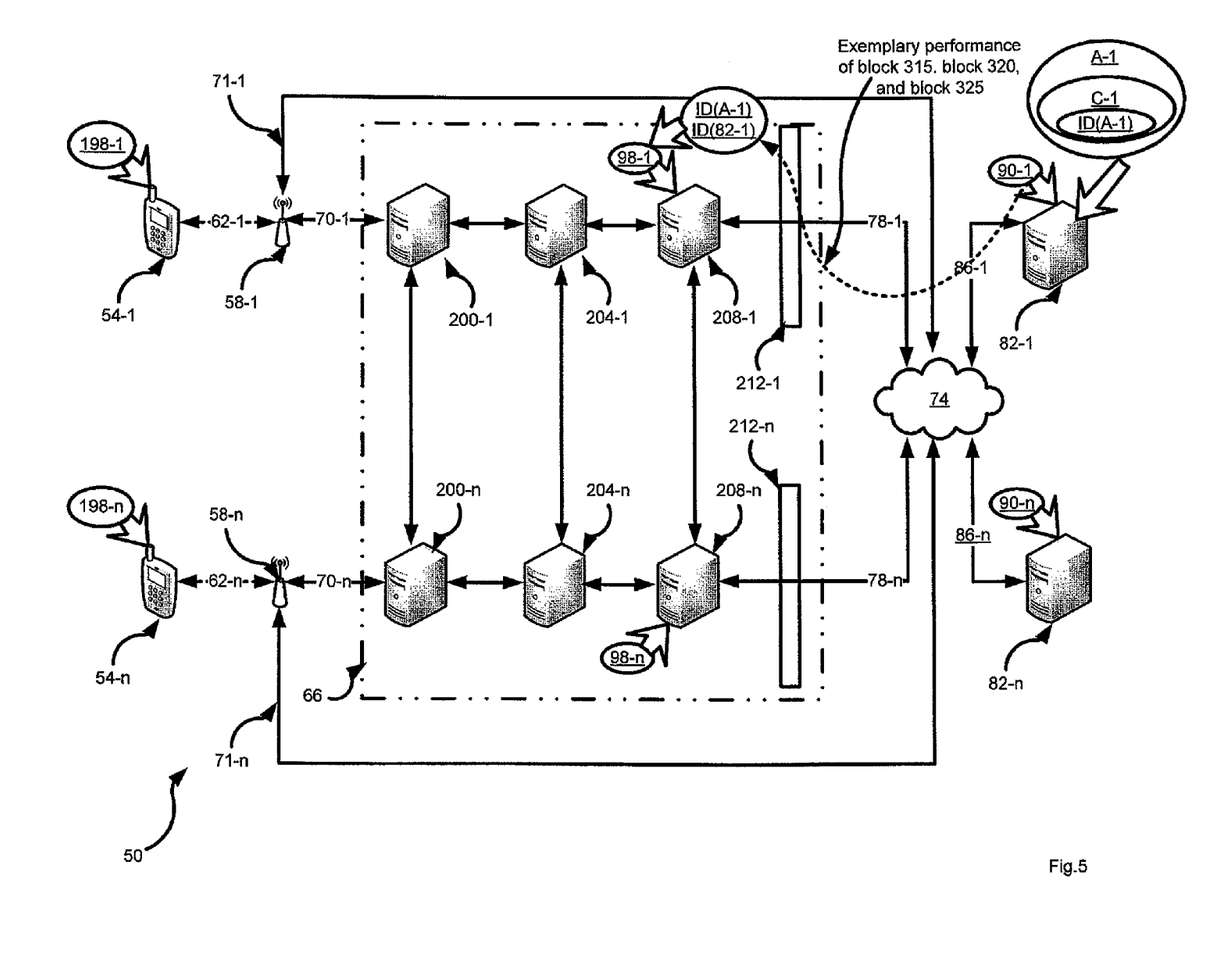
FIG. 5 shows the system of FIG. 1 during an illustrative example of performance of certain blocks of the method of FIG. 3.

Block 315 comprises sending a server identifier and an account identifier to a registration server. In the present example, servers 82 are each configured with addressing information for either or both of servers 208. In one implementation, server 82-1 is geographically nearer to server 208-1 than server 208-*n*, and is therefore configured only with addressing information for server 208-1, while server 82-*n* is geographically closer to server 208-*n* than server 208-1 and is therefore configured only with addressing information for server 208-*n*, and any needed synchronization between register 98-1 to register 98-*n* is handled internally by intermediation infrastructure 66. Accordingly, as represented in FIG. 5, at block 315 server 82-1 sends a server identifier ID(82-1) and an account identifier ID(A-1) to registration server 208 for storage in register 98-1. Account identifier ID(A-1) can correspond exactly with credentials C-1, if desired.

Block 320 comprises receiving the server identifier ID(82-1) and the account identifier ID(A-1), at the registration server 208-1, that were sent in block 315.

Block 325 comprises storing the server identifier ID(82-1) and the account identifier ID(A-1) at the registration server 208-1. In the present example, the registration server 208-1 stores the server identifier ID(82-1) and the account identifier ID(A-1) in the register 98-1. In one implementation, the server identifier ID(82-1) is stored in an entry by designating the account identifier ID(A-1) as the key for the entry and the server identifier ID(82-1) as the content of the entry.

At this point performance of method 300 concludes. It should now be understood that method 300 can be repeated by either server 82 to create as many accounts as desired.

Figure 6:
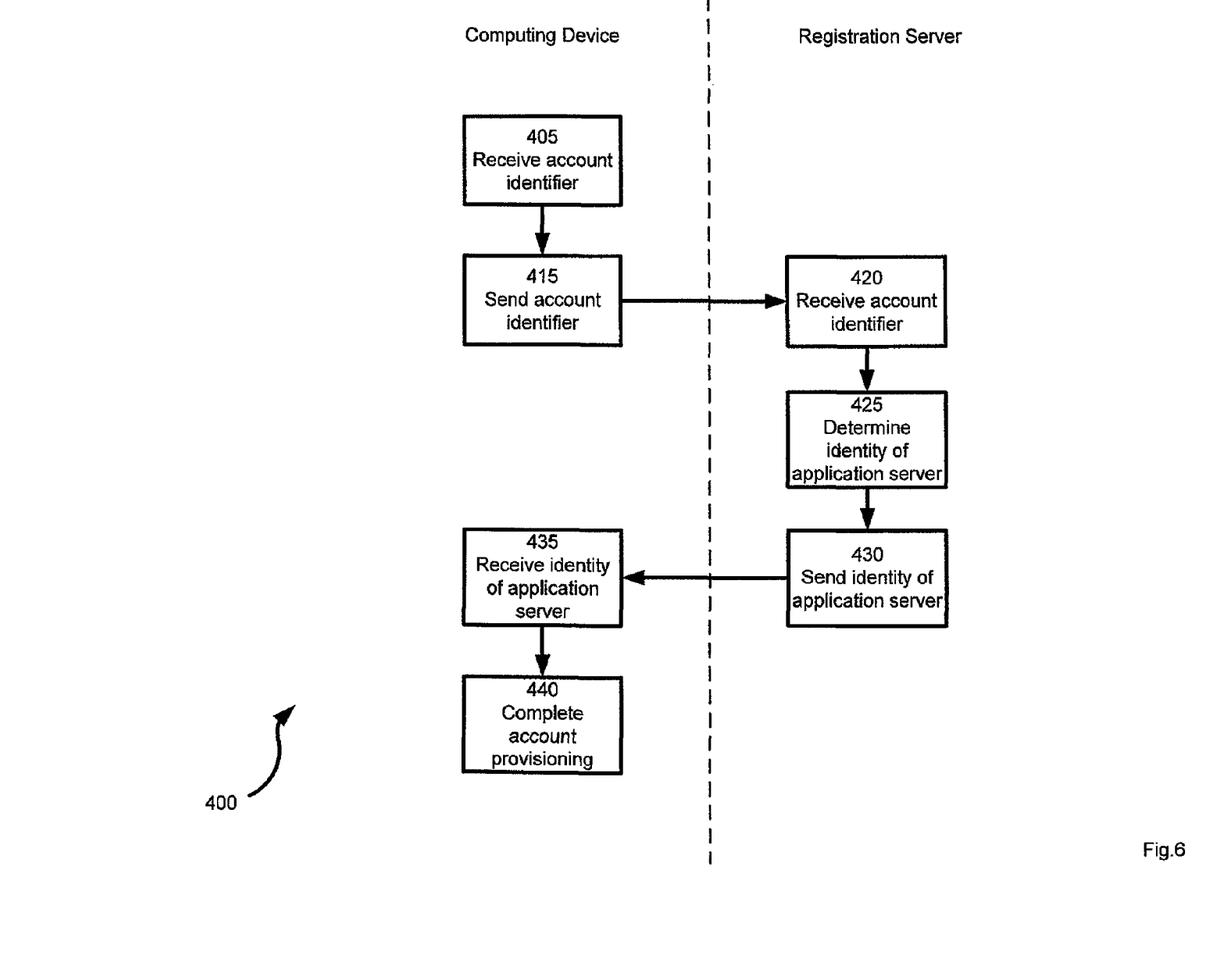
FIG. 6 shows a flowchart depicting a method for configuring a device for interaction with a server.

Referring now to FIG. 6, a method for configuring a device for interaction with a server is represented in the form of a flowchart and indicated generally at 400. Method 300 can be implemented using system 50 or variations thereof, and in particular it is contemplated it is performed by computing device 54 and registration server 208.

Block 405 comprises receiving an account identifier at a computing device. Block 405 can be performed via any computing device 54. In a non-limiting, typical scenario, an administrator of a server 82 would advise an operator of a particular computing device 54. Continuing with the specific, but non-limiting example discussed above in relation to method 300, an administrator of server 82-1 can convey credentials C-1, (or any other data that corresponds with account identifier ID(A-1)), to an operator of, for example, device 54-1. The operator of device 54-1 can then utilize input devices on device 54-1 to enter credentials C-1 into device 54-1.

Block 415 comprises sending the account identifier received at block 405 to a registration server. Note that the address of a particular registration server 208 can be preconfigured within device 54. Such preconfiguration can be effected at the time of manufacture of device 54, or at the time of initial provisioning of device 54 on a particular wireless network. Other times and means for preconfiguring the address of registration server 208 with device 54 will now occur to those skilled in the art.

Block 420 comprises receiving the account identifier that was sent at block 415 at the registration server.

Figure 7:
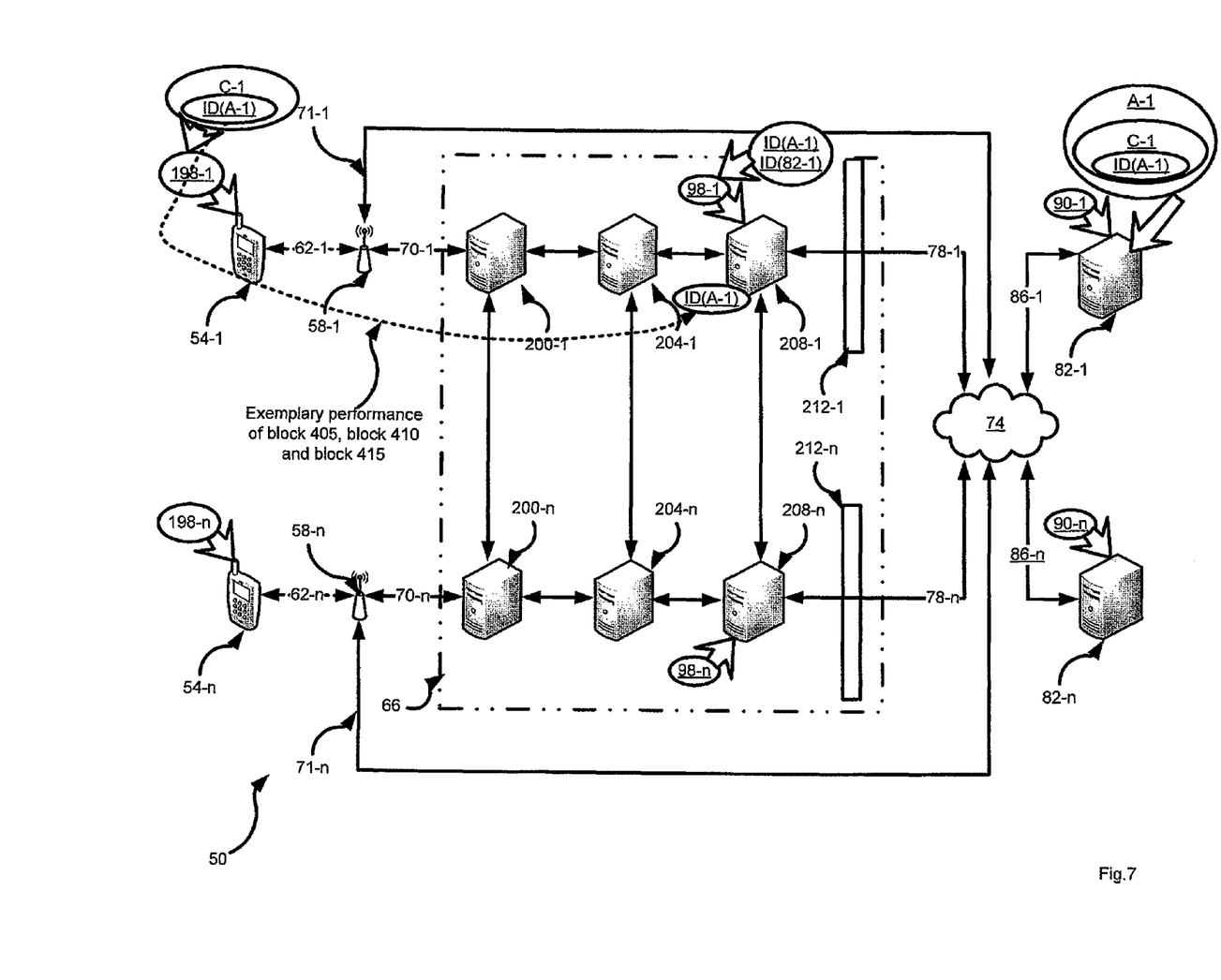
FIG. 7 shows the system of FIG. 1 during an illustrative example of performance of certain blocks of the method of FIG. 6.

This example performance of block 405, block 415 and block 420 is shown in FIG. 7, as credentials C-1, which in this example comprises account identifier ID(A-1), are entered into device 54-1 and account identifier ID(A-1) is sent to registration server 208-1.

Block 425 comprises determining the identity of the application server. More specifically, block 425 can comprise determining an address for the application server that corresponds to account identifier received at block 420. Block 425 can be effected in various ways. For example, a simple look up within register 98-1 can be performed to search for an entry that matches the account identifier ID(A-1) received at block 415. In the specific structure of intermediation infrastructure 66, if no match for account identifier ID(A-1) is found within register 98-1, then registration server 208-1 can be configured to initiate a search for account identifier ID(A-1) within registration server 208-n (or any other registration server 208 that is within intermediation infrastructure 66. In the event that no match is found for account identifier ID(A-1) within intermediation infrastructure 66, then a registration server 208 can be configured to generate an exception, typically in the form of an error message that is returned to computing device 54. While the generation of an exception at block 425 is not shown in FIG. 6, those skilled in the art will recognize that the flowchart in FIG. 6 can be modified to accommodate such an exception.

Figure 8:
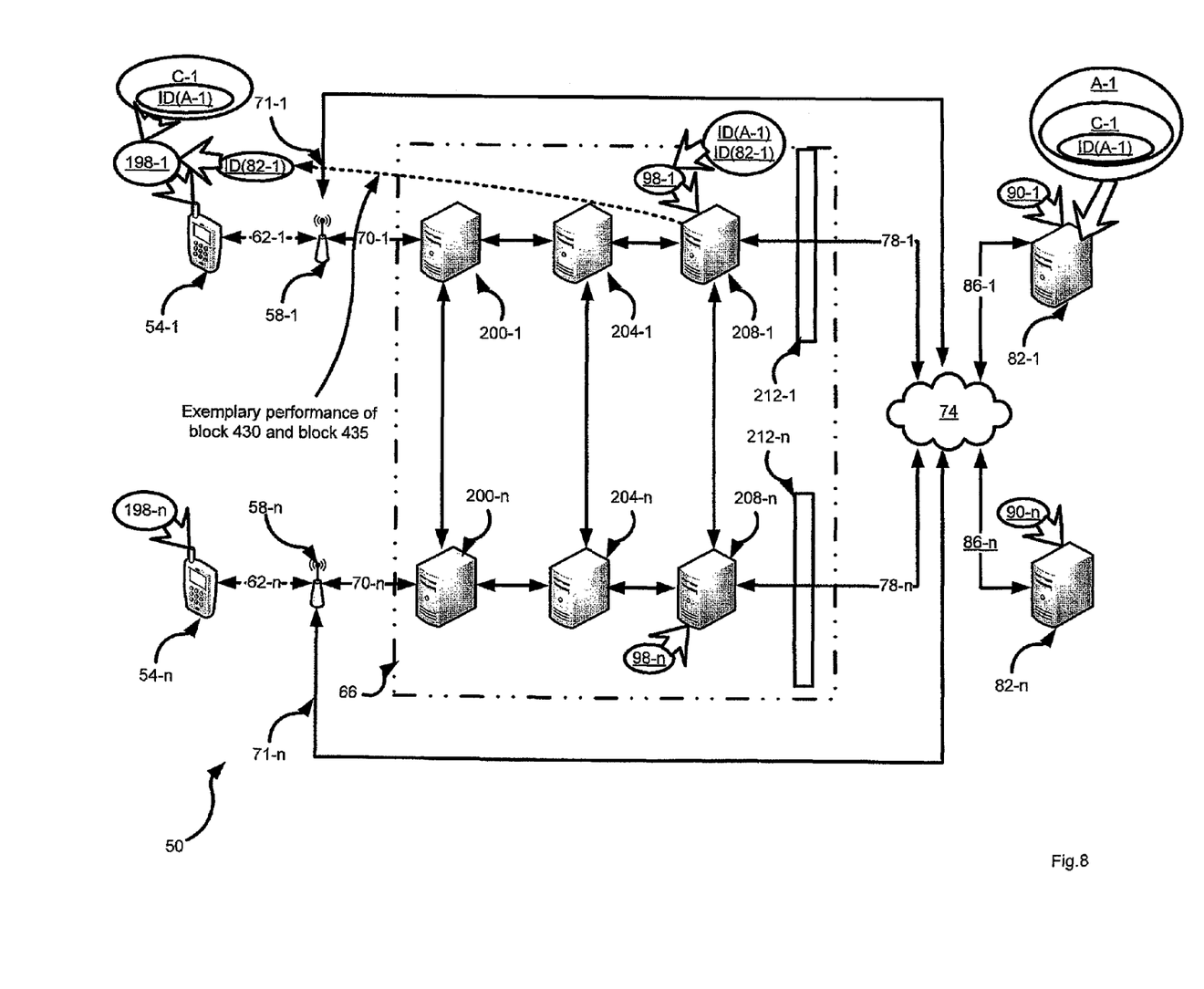
FIG. 8 shows the system of FIG. 1 during an illustrative example of performance of certain blocks of the method of FIG. 6.

Continuing with the specific example from above, at block 425 server 208-1 compares the account identifier received at block 420 with the contents of register 98-1 and determine that server identifier ID(82-1) matches account identifier ID(A-1). Block 430 comprises sending the identity of the application server determined at block 425 from registration server 208 to computing device 54. Block 435 comprises receiving the identity of the application server at computing device 54. This example performance of block 430 and block 435 is shown in FIG. 8, as server identifier ID(82-1), which corresponds to the network address for server 82-1, is sent to computing device 54-1.

Figure 9:
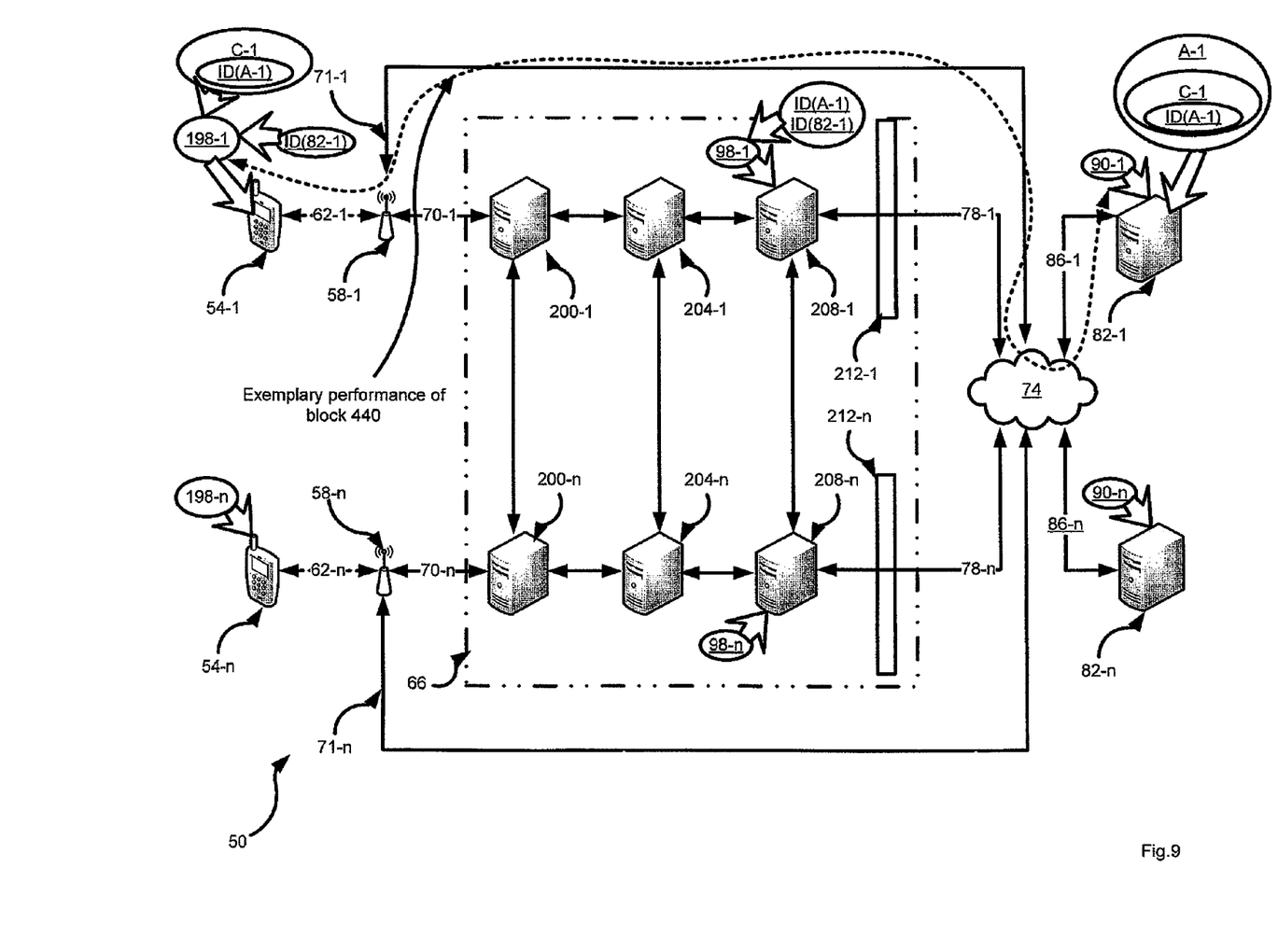
FIG. 9 shows the system of FIG. 1 during an illustrative example of performance of certain blocks of the method of FIG. 6.

Block 440 comprises completing account provisioning. Block 440 can be effected in a variety of ways, but in general comprise the utilization of the server identifier received at block 435 so the client-side application 198 on that computing device 54 can begin coordinating communication with the server-side application 90 residing on the application server 82 having an address corresponding the server identifier received at block 435. As one specific example, the computing device 54 can begin direct communication with the identified application server 82 to complete account provisioning, or such communications can be carried through intermediation infrastructure 66. Example performance of block 440 in accordance with the example discussed above is shown in FIG. 9, a communication path is established directly between client-side application 198-1 and server side application 90-1. Furthermore, the credentials C-1 at computing device 54-1 can now be used to access account A-1 at server 82-1.

Having read the foregoing, it should now be understood that variations, subsets or combinations or all of them are contemplated. For example, it should now be understood that method 300 and method 400 can be repeated to set up one or more additional accounts A on any server 82 and to configured any device 54 to interact with those accounts. Without limiting the generality of the foregoing concept, it should now be understood that device 54-1 can be configured to have one or more accounts A, on server 82-1 or server 82-n or any other servers 82 connected to system 50. By the same token, device 54-n (or any other device 54 connected to system 50) can be can be configured to have one or more accounts A, on server 82-1 or server 82-n or any other servers 82 connected to system 50.

As another example it should again be reemphasized that the nature of the client-side application 198 and the server-side application 90 is not limited to email, but can comprise other applications or services as well. Examples include, but are not limited to, contact management applications, calendaring applications, social networking applications, and media storage applications. By the same token, it should be understood that the concept of an account A is not to be construed in a limiting sense, but rather any software structure for pairing a given client-side application 198 on a particular device 54 with a given server-side application 90 on a particular server 82.

It is to be understood that each server 82, 200, 204, 208, can be implemented using an appropriately configured hardware computing environment, comprising at least one processor, volatile storage (e.g. random access memory), non-volatile storage (e.g. hard disk drive), and at least one network interface all interconnected by a bus. Other components can also be connected to the processor via the bus, such as input devices and output devices. Likewise it is to be understood that the hardware computing environment of any particular server is configured to execute an operating system and other software such that the servers are ultimately configured to perform according to the teachings herein. Furthermore, it will be understood that each server can itself be implemented as several different servers, or alternatively one or more servers in FIG. 1 can be consolidated into a single server.

The invention claimed is:

1. A method for configuring a computing device for interaction with a server, the method comprising:
  receiving an account identifier at the computing device, the account identifier corresponding to a single one of a plurality of accounts maintained by an application hosted on one of a plurality of application servers;
  retrieving a preconfigured registration server address identifying a registration server from a memory of the computing device;
  sending a first request including the account identifier to the registration server;
  receiving an application server identifier based on a matching of the account identifier to a further account identifier paired with the application server identifier maintained by the registration server;
  locating an application server based on the application server identifier;
  establishing communication between the computing device and the application server; and
  sending a second request, including the account identifier to the application server, for accessing the single one of the plurality of accounts from the computing device.

2. The method of claim 1 wherein the account identifier is associated with a client-side application executable on the computing device, the client-side application corresponding to the server application.

3. The method of claim 2 wherein the sending the account identifier to the registration server includes sending the account identifier to the registration server via a mediation server and a gateway.

4. The method of claim 3 wherein the establishing communication includes establishing communication between the client-side application and the server application.

5. The method of claim 4 wherein the account identifier corresponds with credentials of the account.

6. The method of claim 5 wherein the application server identifier corresponds with a network address of the application server.

7. The method of claim 6 comprising:
prior to the receiving the account identifier, creating the account, at the application server;
sending the application server identifier and the account identifier from the application server to the registration server.

8. The method of claim 7 comprising:
receiving the application server identifier and the account identifier at the registration server, from the application server; and
storing the application server identifier and the account identifier at the registration server.

9. The method of claim 6 wherein the client-side application includes a social networking client application and the server-side application includes a social networking server application.

10. The method of claim 6 wherein the client-side application includes an email client application and the server-side application includes an email server application.

11. A computing device comprising:
a memory interconnected with a processor;
the processor configured to receive an account identifier, the account identifier corresponding to a single one of a plurality of accounts maintained by an application hosted on one of a plurality of application servers;
the processor configured to retrieve a preconfigured registration server address identifying a registration server from the memory;
the processor further configured to send a first request including the account identifier to the registration server;
the processor further configured to receive an application server identifier from the registration server based on a matching of the account identifier to a further account identifier paired with the application server identifier maintained by the registration server;
the processor further configured to locate an application server based on the application server identifier;
the processor further configured to establish communication between the computing device and the application server; and
the processor further configured to send a second request including the account identifier to the application server, to access the single one of the plurality of accounts from computing device.

12. The computing device of claim 11 wherein the account identifier is associated with a client-side application executable on the computing device, the client-side application corresponding to the server application.

13. The computing device of claim 12 wherein the send the account identifier to the registration server includes send the account identifier to the registration server via a mediation server and a gateway.

14. The computing device of claim 13, the processor configured to establish communication by establishing communication between the client-side application and the server application.

15. The computing device of claim 14 wherein the account identifier corresponds with credentials of the account.

16. The computing device of claim 15 wherein the application server identifier corresponds with a network address of the application server.

17. The computing device of claim 16 wherein the client-side application includes an email client application and the server-side application includes an email server application.

18. A registration server, comprising:
A network interface for connecting the registration server to a computing device and a plurality of application servers;
a memory; and
a processor configured to:
receive, via the network interface from one of the application servers, a first account identifier corresponding to a single one of a plurality of accounts maintained by a single server application hosted on the one application server;
pair the account identifier with an application server identifier identifying the one application server;
store the paired identifiers in a record in the memory;
subsequent to the storing, receive a second account identifier from the computing device;
determine whether the second account identifier matches the first account identifier;
when the determination is affirmative, retrieve the application server identifier paired with the first account identifier in the memory; and
send the application server identifier to the computing device.

19. A non-transitory computer readable storage medium having a computer-readable program code executable by a computing device to implement a method to configure the computing device for interaction with a server, the method comprising:
receiving an account identifier at the computing device, the account identifier corresponding to a single one of a plurality of accounts maintained by an application hosted on one of a plurality of application servers;
retrieving a preconfigured registration server address identifying a registration server from a memory of the computing device;
sending a first request including the account identifier to the registration server;
receiving an application server identifier, at the computing device, based on a matching of the account identifier to a further account identifier paired with the application server identifier maintained by the registration server;
locating an application server based on the application server identifier;
establishing communication between the computing device and the application server; and
sending a second request including the account identifier to the application server for accessing the single one of the plurality of accounts from the computing device.

* * * * *